Sept. 29, 1942.  C. A. OLCOTT  2,297,162
WATER COOLED BRAKING
Filed Feb. 14, 1941
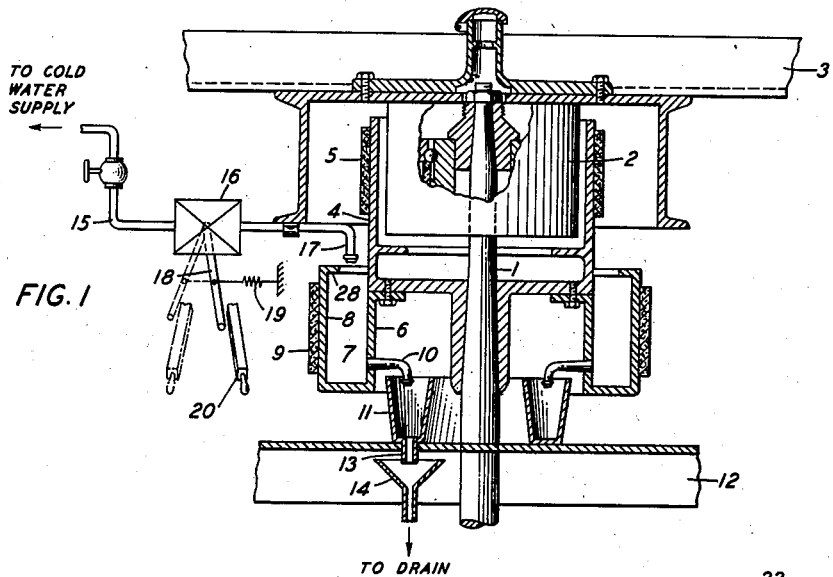
FIG. 1
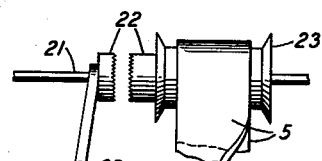
FIG. 2
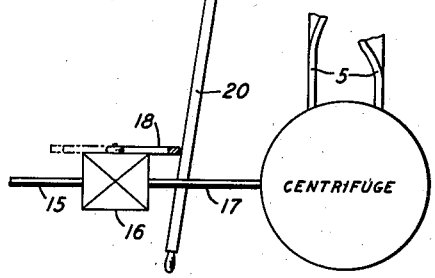
FIG. 3
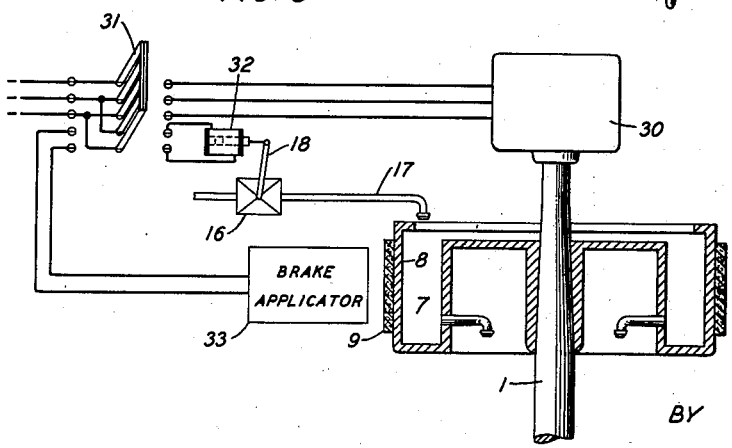
INVENTOR
C. A. OLCOTT
BY
ATTORNEY Patented Sept. 29, 1942

2,297,162

UNITED STATES PATENT OFFICE 2,297,162

WATER COOLED BRAKING

Charles A. Olcott, West Milford, N. J.

Application February 14, 1941, Serial No. 378,893

7 Claims. (Cl. 188—264)

This invention relates to an improvement in liquid cooled brakes and more particularly to water cooled friction brakes of the kind applicable to centrifugal machines and the like.

Heretofore centrifugal machines have been provided with an external friction brake comprising a brake drum concentrically mounted on the vertical drive shaft or spindle and so arranged that the inner face of the drum constitutes the outer wall of an annular water-retaining channel or gutter. To dissipate the heat generated in the drum incidental to braking of the machine cold water is continually flowed into the gutter while the machine is operating, and a stationary scoop disposed within the gutter continually removes the excess water at the rate at which it is admitted. Such prior art arrangements suffer from several disadvantages of which the rapid wearing of the scoop is one and splashing of water due to overflow from the brake cutter is another.

The principal object of the present invention is to provide an improved water cooled friction brake and a method of brake cooling especially adapted for centrifugal machines in general and more particularly adapted for the operating conditions encountered in the present day use of centrifugal machines for the treatment of sugar bearing materials.

In accordance with the present invention there is provided a water cooled brake of the kind described in which, however, cold water is stored in the channel or gutter whenever the machine comes to rest and in predetermined quantity such that the inner face of the brake drum is covered with walled-up or centrifuged water when the machine is operating at normal full speed. The walled-up water is utilized to absorb and dissipate heat generated primarily during a preceding braking operation and to maintain the parts at a safe operating temperature throughout extended periods of cyclical operation of the machine. Provision is made also for circulating cold water through the gutter during and after the braking period, thus removing heated water from the gutter and to some extent cooling the brake and adjoining parts in preparation for another cycle. Further provision is made to insure that just enough cold water is stored in the gutter that none of it is spilled over the top thereof by centrifugal action.

The nature of the present invention and its various objects, features and advantages will appear more fully from a consideration of the embodiments illustrated in the accompanying drawing and now to be described. In the drawing, Fig. 1 shows in elevation and partial section one arrangement in accordance with the invention as applied to a belt-driven centrifugal;

Fig. 2 is a plan view thereof further illustrating certain automatic controls provided; and Fig. 3 illustrates an application of the invention to an electrically driven centrifugal.

Referring more particularly to Fig. 1, there is illustrated a belt-driven gyratory centrifugal machine comprising a vertical drive shaft or spindle 1 which carries at its lower extremity a centrifugal basket, not shown, which for specific example may be adapted for purging crystalline sugar of adhering mother liquor. Within a casing 2 surrounding the upper end of spindle 1 is a stationary ball bearing in which the spindle is journaled and supported. Casing 2 is in turn supported from frame member 3. Although a variety of suitable bearing structures are known to those skilled in the art, I may refer to my pending application Serial No. 298,631, filed October 9, 1939 which issued March 11, 1941, as U. S. Patent No. 2,234,574 and to my Patent No. 1,443,884, dated January 30, 1923 for further illustration.

Secured to spindle 1 and extending concentrically around casing 2, as shown in detail in Fig. 1, is a pulley member 4 which is driven by a belt 5 from a line shaft not shown in this figure.

Another hollow cylindrical member 6, bolted to member 4 and arranged to form a downward continuation of the pulley face thereof, constitutes the inner wall and bottom of an annular gutter or channel 7 the outer wall of which is constituted by a brake drum 8. The latter carries an external brake band 9 which may be tightened around the drum, by brake operating means not shown, whenever the machine is to be stopped. Part way up the inner wall of gutter 7 one or more inwardly directed spouts or overflow outlets 10 are provided. Below the overflow spouts 10 there is disposed an annular trough 11 which is fixedly mounted, as on frame member 12, concentrically with spindle 1 and in such position as to receive the overflow from spouts 10. At the bottom of trough 11 is a drain pipe 13 which discharges to the drain preferably through a funnel 14 so that the operator of the machine can tell at a glance whether water is flowing as it should.

From a source not shown, cold water is brought through a supply pipe 15 and shut-off valve 16 to a pipe 17 that discharges into the open top or mouth of gutter 7. The position of the operating lever 18 of valve 16, which is biased by a spring 19 or other suitable means to its open position, is controlled by clutch lever 20. As indicated more fully in Fig. 2, clutch lever 20 pivoted around pivot point 29 is arranged to control the driving relation between belt 5 and line shaft 21. With the handle of the clutch lever 20 in its right hand position, the right hand portion of the clutch 22 and its associated driving pulley 23 are disengaged from line shaft 21, and the bias applied to valve 16 holds that valve open. With the controls in this position the machine is at rest, while cold water flows through valve 16 into gutter 7 and is continuously discharged through overflow spouts 10.

When the handle of the clutch lever 20 is moved to the left to engage clutch 22 and thereby to start the machine, valve lever 18 is simultaneously forced to its closed position thereby cutting off the flow of water through valve 16 to gutter 7. At first the cold water in gutter 7 is at an undisturbed level fixed by the height of the overflow spouts 10, but as the machine gains speed this water begins to wall up against the inner face of brake drum 8 until it reaches and partially spreads over the lower face of an inwardly extending flange or lip 28 provided at the upper edge of the brake drum. The height of the overflow spouts 10 is so calculated and fixed, however, that with the machine operating at top speed the water centrifuged against drum 8 fails by a substantial margin to reach the point of spilling over the top. Although the amount of margin so provided is not especially critical I have found it advantageous to so arrange the height of the overflow spouts 10 that the water retained in the gutter 7 with the machine at rest is about half the amount that could be retained without spill-over with the machine operating at top speed.

After the machine has been run for the length of time required by the particular material being centrifuged, the handle of the clutch lever 20 is moved to the right (the position shown in Fig. 2), thereby disengaging clutch 22, and brake 9 is simultaneously applied. Simultaneously, lever 18 is released thereby allowing valve 16 to open and causing cold water to flow at a predetermined rate into brake gutter 7. In view of the fact that the walled-up water in gutter 7 is below the spill-over point there is still some capacity left for accommodating the incoming cold water and this capacity increases as the braking action proceeds and the centrifugal force exerted on the water in the gutter falls. The rate of flow of the incoming cold water may accordingly be so selected with relation to the rate of deceleration of the machine and to the aforementioned margin that the water in gutter 7 is maintained below the spill-over point throughout the braking period.

At some point during the braking period, or in some cases it may be not until the machine has completely stopped, the water in gutter 7 rises along the inner face thereof and begins to overflow through spouts 10. Eventually of course the water level becomes horizontal at the level of the overflow spouts and a measured quantity of water is thereafter maintained in the gutter.

For a complete understanding of the present invention it is important to bear in mind that the heat generated by the braking operation is not immediately transmitted through the brake drum to the inner face thereof and that the greater part of the heat to be dissipated may in fact not reach the inner face until after the machine has been brought to rest, which may be a half-minute for example after initial application of the brake. Such heat as is transmitted while the machine is decelerating may be transferred in some degree to the walled-up water in the gutter and promptly carried off when the gutter water discharges through the overflow spouts 10. As the water level falls along the inner face of the brake drum a film of water is left on the exposed surface, and evaporation of this film contributes also to the dissipation of heat transmitted through the brake drum. Most of the heat generated, however, may not be dissipated in this manner, and ordinarily it is not, but it is stored in the brake drum until the machine is again started and the cold gutter water again mounts the inner face of the brake drum. The stored-up heat is then quickly transferred to the water and the brake parts thereby reduced to a safe temperature, and it is not until the brake has again been applied and valve 16 has been opened that the heated water is removed through the overflow spouts. It should be appreciated that the undissipated heat left after a single braking operation is not so great that a dangerous temperature is reached, but that repeated braking on successive cycles of operation would quickly give rise to excessive temperatures except for the periodic removal of the stored heat.

Although it should be apparent that the invention is not limited in its application to a belt-driven centrifugal machine, consideration of the modification illustrated in Fig. 3 may help to make this fact clear. Fig. 3 illustrates schematically a centrifugal machine with individual electric drive comprising motor 30 connected in driving relation to the upper end of centrifugal spindle 1. A friction brake of the kind shown in Fig. 1, comprising brake drum 8 and brake drum gutter 7, is mounted on the spindle 1 and water is admitted to the gutter 7 through shut-off valve 16 and pipe 17 as in the preceding example. Multi-pole double-throw switch 31 is interposed in the electric power supply leads to motor 30.

The operating lever 18 of valve 16 is Fig. 3 is controlled by a solenoid 32 which, upon closure of switch 31 to start the motor, is energized to retract its armature and force lever 18 to its closed position. Upon throwing motor switch 31 to its alternative position solenoid 32 is de-energized and valve 16 enabled to open, thereby admitting water to gutter 7. At the same time the brake applicator 33 is electrically energized and causes the friction brake to be applied. The operation is otherwise the same as that described with reference to Figs. 1 and 2.

Although the invention has been described with reference to specific embodiments thereof, it will be apparent to those skilled in the art that various modifications are possible within the spirit and scope of the appended claims.

I claim:

1. In combination with a cyclically operated centrifugal machine, a friction brake for said machine comprising a rotating brake drum, an annular gutter comprising said brake drum for retaining cooling liquid walled up therein while the drum is rotating, means for introducing cooling liquid into said gutter while said machine is at rest, means responsive to the starting of said machine for stopping the flow of said cooling liquid into said gutter, and overflow means for carrying off from said gutter any cooling liquid in excess of the amount which can be retained in said gutter while said machine is operating.

2. A combination in accordance with claim 1 comprising a stationary annular trough for receiving the excess liquid from said overflow means.

3. The method of cooling a friction brake having a brake drum and an annular gutter comprising said brake drum as its outer face, which method comprises circulating cooling liquid into and out of said gutter while said brake drum is stationary, at the same time maintaining the volume of said liquid in said gutter substantially constant, interrupting the circulation of said liquid when the said brake drum begins to rotate, and resuming the circulation of said cooling liquid while said brake is applied.

4. The method defined in claim 3 in which more particularly the circulation of said cooling liquid is resumed concurrently with the application of said brake.

5. In combination with a cyclically operated centrifugal machine, a friction brake for said machine comprising a rotating brake drum, an annular gutter comprising as its outer wall said brake drum for retaining cooling liquid walled up therein while the drum is rotating, means for introducing cooling liquid into said gutter while said machine is at rest, means responsive to the starting of said machine for stopping the flow of said cooling liquid into said gutter, and overflow means for carrying off from said gutter any cooling liquid in excess of the amount which can be retained in said gutter while said machine is operating, said overflow means comprising a plurality of openings in the inner wall of said annular gutter.

6. In combination with a cyclically operated centrifugal machine, a friction brake for said machine comprising a rotating brake drum, an annular gutter comprising as its outer wall said brake drum for retaining cooling liquid walled up therein while the drum is rotating, means for introducing cooling liquid into said gutter while said machine is at rest, means responsive to the starting of said machine for stopping the flow of said cooling liquid into said gutter, and overflow means for carrying off from said gutter any cooling liquid in excess of the amount which can be retained in said gutter while said machine is operating, said overflow means comprising a plurality of openings in the inner wall of said annular gutter which are located nearer the bottom of said annular gutter than the top thereof.

7. In combination with a cyclically operated centrifugal machine, a friction brake for said machine comprising a rotating brake drum, an annular gutter comprising as its outer wall said brake drum for retaining cooling liquid walled up therein while the drum is rotating, means for introducing cooling liquid into said gutter while said machine is at rest, means responsive to the starting of said machine for stopping the flow of said cooling liquid into said gutter, overflow means for carrying off from said gutter any cooling liquid in excess of the amount which can be retained in said gutter while said machine is operating, said overflow means comprising a plurality of openings in the inner wall of said annular gutter, a stationary annular trough beneath said openings, and means for directing the flow of water from said openings into said trough.

CHARLES A. OLCOTT.